W. C. GEORGE AND F. N. NOFSGER.
VEHICLE HOISTING DEVICE.
APPLICATION FILED SEPT. 15, 1919.
1,354,038.
Patented Sept. 28, 1920.
3 SHEETS—SHEET 1.
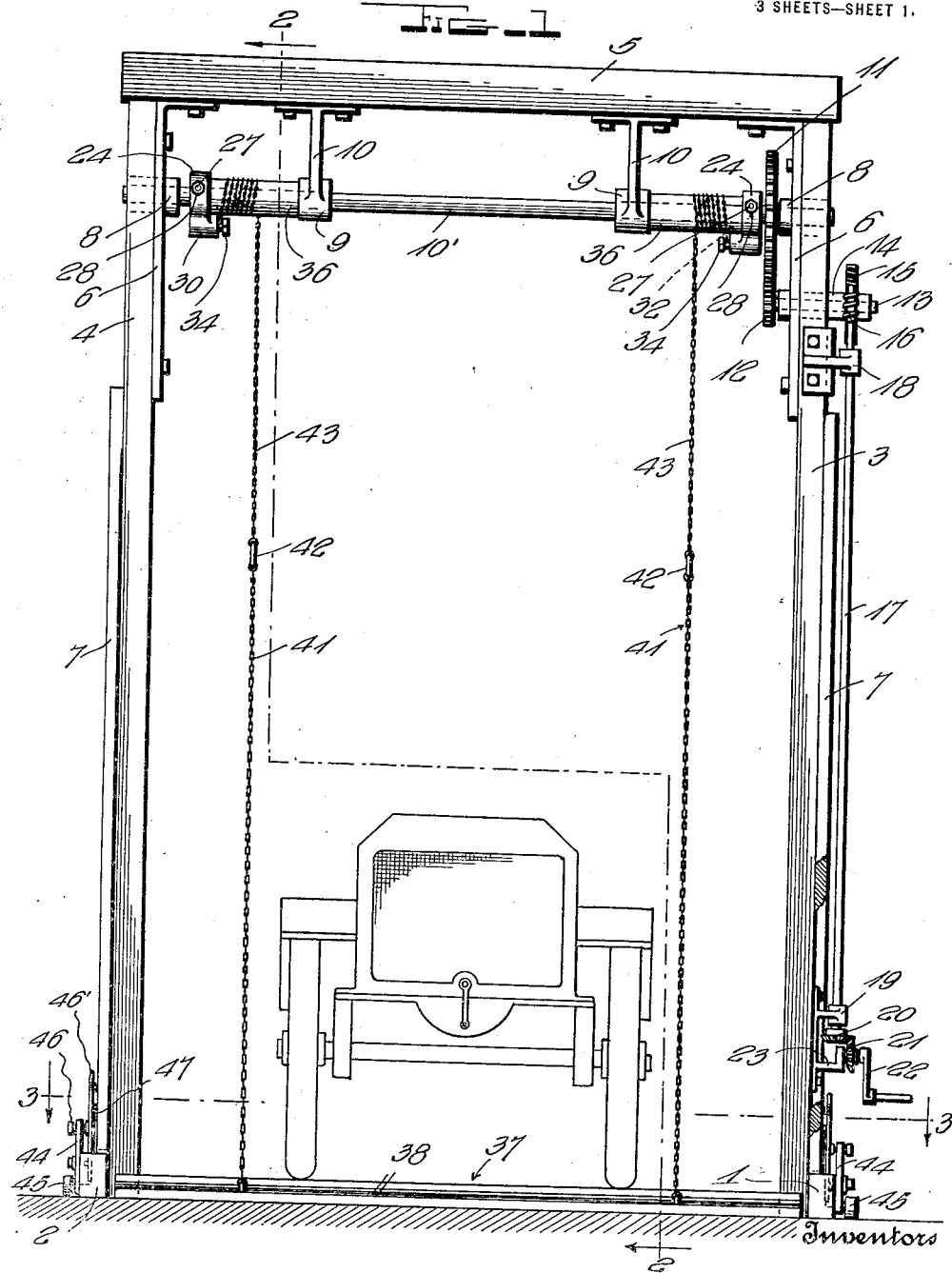
Inventors
W. C. George
F. N. Nofsger
By
Attorneys W. C. GEORGE AND F. N. NOFSGER.
VEHICLE HOISTING DEVICE.
APPLICATION FILED SEPT. 15, 1919.
1,354,038.
Patented Sept. 28, 1920.
3 SHEETS—SHEET 2.
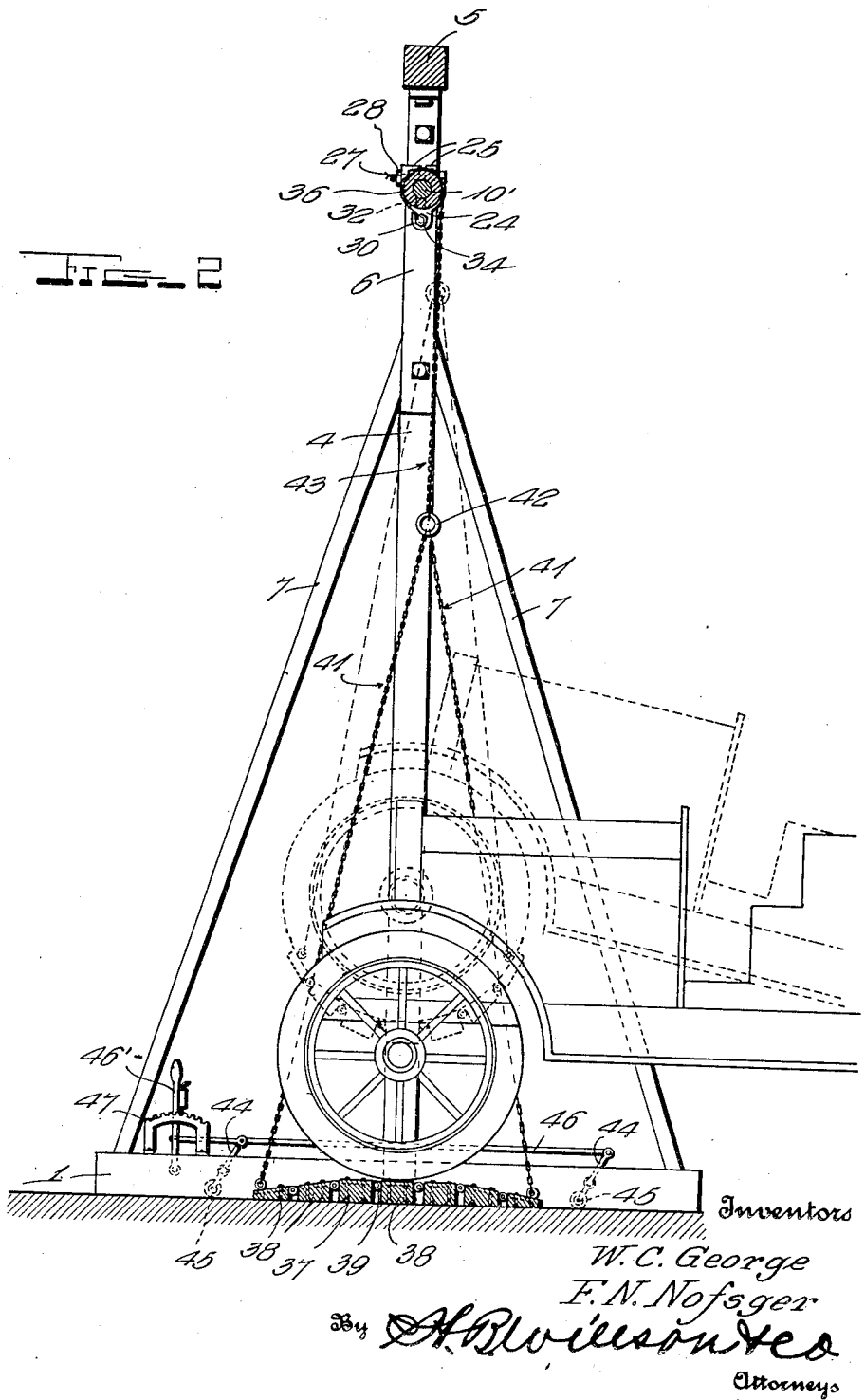

W. C. GEORGE AND F. N. NOFSGER.
VEHICLE HOISTING DEVICE.
APPLICATION FILED SEPT. 15, 1919.
1,354,038.
Patented Sept. 28, 1920.
3 SHEETS—SHEET 3.
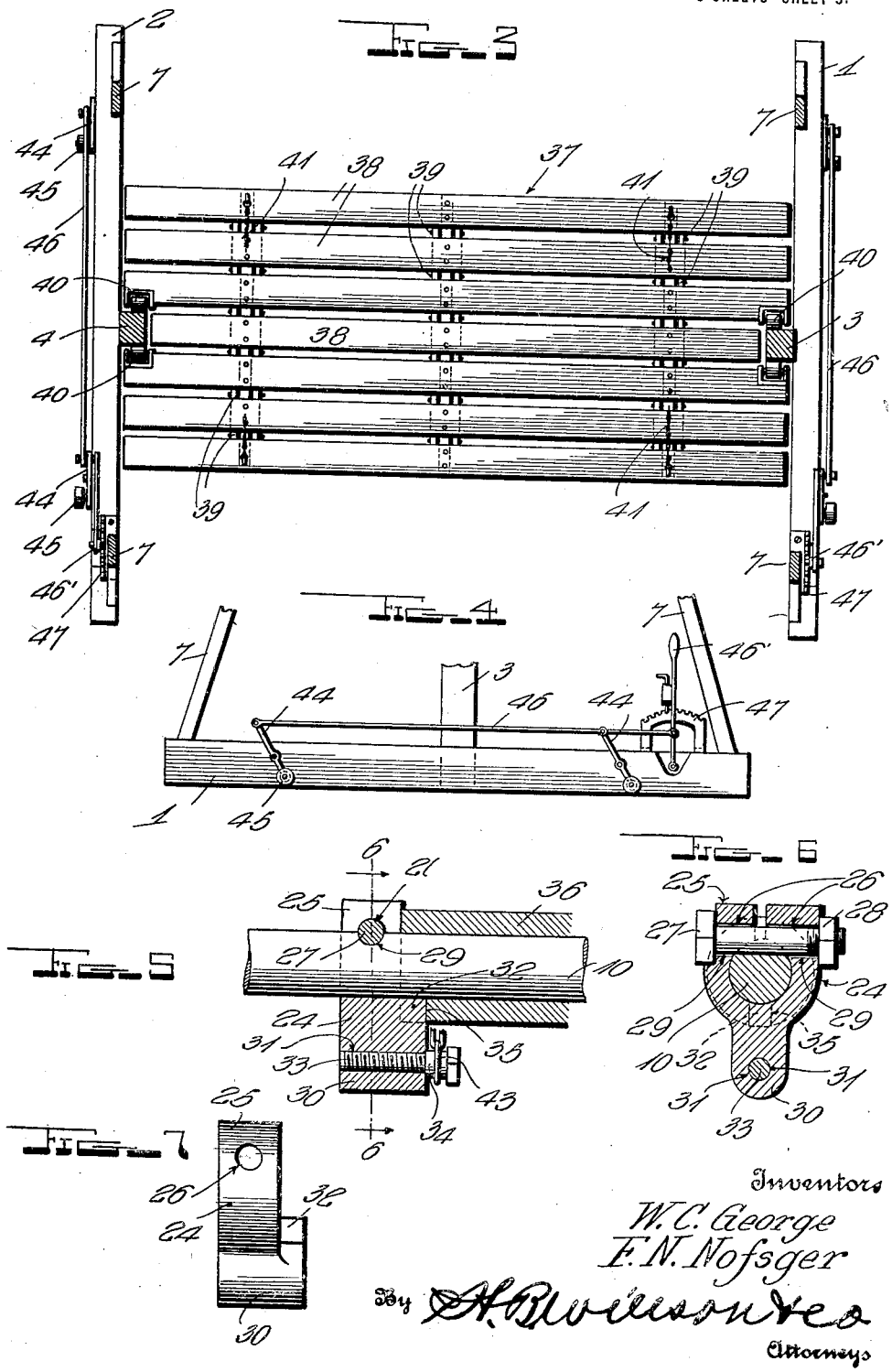
Inventors
W. C. George
F. N. Nofsger
By H. B. Williamson &co
Attorneys

UNITED STATES PATENT OFFICE.

WILLIAM C. GEORGE AND FRED N. NOFSGER, OF HUMBOLDT, NEBRASKA.

VEHICLE-HOISTING DEVICE.

1,354,038. Specification of Letters Patent. Patented Sept. 28, 1920.

Application filed September 15, 1919. Serial No. 323,740.

*To all whom it may concern:*

Be it known that we, WILLIAM C. GEORGE and FRED N. NOFSGER, citizens of the United States, residing at Humboldt, in the county of Richardson and State of Nebraska, have invented certain new and useful Improvements in Vehicle-Hoisting Devices; and we do declare the following to be a full, clear, and exact description of the invention, such as will enable others skilled in the art to which it appertains to make and use the same.

This invention relates generally to hoists, but more particularly to vehicle hoisting devices.

The principal object of the invention is to provide a hoisting device to be used for raising one end of a motor or other vehicle so that the same can be loaded or unloaded. The device is especially constructed so that it can be used where vehicles are unloaded over a dump, such as in grain elevators and mills.

Another object of the invention is to provide a vehicle hoisting device having rollers or wheels so that the device can be easily moved from place to place.

A further object of the invention is to provide a device of this nature which will be comparatively simple, strong, durable and inexpensive in construction, one which will be efficient and reliable in operation, and well adapted to the purpose for which it is designed.

With these and other objects in view, the invention consists of certain novel features of construction, and the combination and arrangement of parts as will be hereinafter fully described and claimed.

In the accompanying drawings in which similar reference characters designate like parts throughout the several views, Figure 1 is a front view of a hoisting device constructed in accordance with this invention.

Fig. 2 is a vertical sectional view of the device taken substantially on the line 2—2 of Fig. 1.

Fig. 3 is a horizontal sectional view taken on the line 3—3 of Fig. 1.

Fig. 4 is an elevation of a portion of one side of the device.

Fig. 5 is an enlarged longitudinal sectional view of one of the winding drums and the adjacent bracket to which the flexible element which passes over the drum is fastened so as to rotate with the drive shaft.

Fig. 6 is a transverse sectional view through this bracket taken on the plane indicated by the line 6—6 of Fig. 5, and Fig. 7 is an edge view of one of the brackets.

The preferred form of the invention comprises a supporting frame composed of a pair of spaced parallel side bars 1 and 2 having secured at their middle portions a pair of upright posts or standards 3 and 4 respectively, the latter being fastened to the bars 1 and 2 at their lower ends. The upper ends of the posts 3 and 4 are connected by a cross bar or beam 5, the ends of which are secured to the ends of the posts 3 and 4 in any convenient manner but preferably by means of angles 6 which are bolted to the posts 3 and 4 and the beam 5. The posts 3 and 4 are braced by diagonal braces 7 which have their upper ends secured to the latter at a point a slight distance below the upper ends of the posts and their lower ends secured to the ends of the side bars 1 and 2.

Extending transversely between the posts 3 and 4 adjacent the upper ends thereof and mounted in bearings 8 arranged in the posts and in bearings 9 carried by brackets 10 attached to the cross bar or beam 5 is a shaft 10'. This shaft 10' carries at one of its ends a gear 11 which meshes with a pinion 12 carried by a stub shaft 13 mounted in a bearing 14 which is supported by the upright post 3. The stub shaft 13 carries on the outside of the post 3 a worm wheel 15, and meshed with this is a worm 16 carried at the upper end of a vertical shaft 17, the latter being journaled in upper and lower bearings 18 and 19 mounted upon the post 3. The lower end of the shaft 17 carries a bevel pinion 20 which meshes with a similar pinion 21 carried upon the shaft of an operating handle 22, the latter being mounted upon a bracket 23 fastened to the post 3. By operating the handle 22 the shaft 17 will be rotated and through the medium of the worm 16, worm wheel 15, shaft 13, pinion 12 and gear 11, the shaft 10' will be driven.

The shaft 10' carries adjacent its ends brackets 24 which are preferably provided with opposing arms 25 having alined apertures 26 therein for receiving bolts 27 having nuts 28 on their free ends. The opposing arms 25 of the brackets are disposed around the shaft 10' and the bolts 27 engage cut-away portions 29 in the shaft so as to lock the brackets to the latter. The nuts 28 maintain the opposing arms 25 of the brackets in clamped relation around the shaft. The brackets 24 carry laterally extending heads 30 having threaded apertures 31 extending longitudinally therethrough and having lugs 32 disposed at one of their ends. The threaded apertures 31 receive screws 33 having enlarged portions 34 adjacent their heads. The lugs 32 carried by the brackets 24 fit into notches or recesses 35 arranged in the adjacent ends of drums 36 mounted upon the shaft 10' to provide a means whereby the drums are fixed to the shaft to turn with the same.

The numeral 37 designates as an entirety a supporting platform. This platform is composed of a number of bars 38 which extend across the supporting frame from one of the side bars to the other side bar. The bars 38 are hingedly connected together at their adjacent edges by means of suitable hinges 39, three sets of which are shown in the drawings. By referring to Fig. 3 it will be seen that the upright posts 3 and 4 are disposed on the inside of the side bars 1 and 2 and that the middle bar 38 of the supporting platform is shorter than the other bars of the same so that a means is formed whereby the platform is guided in its vertical movement. If desired, anti-friction rollers 40 may be mounted upon the edges of the two bars 38 disposed on either side of the middle bar 38 to engage and run upon the edges of the upright posts 3 and 4. The bars 38 are of varying thicknesses, those at the edges of the platform being thinner than those at the intermediate portion thereof so that when the platform is resting upon the ground or any other flat surface the upper side of the same will be inclined toward its intermediate portion.

Secured at one of their ends to the outer edges of the outermost bars 38 are chains 41 or other suitable suspending devices. The upper ends of these chains 41 are connected to links 42 carried at one of the ends of flexible chains or cables 43 which are wound around the drums 36 and have their free ends secured to the enlargements 34 carried by the screws 33.

Fulcrumed intermediate of their ends to the outer sides of the side bars 1 and 2 are pairs of spaced parallel levers 44 carrying rollers or wheels 45 at their lower ends and connected at their upper ends to rods 46, the latter being coupled to operating levers 46' fulcrumed to the side bars 1 and 2 and operating in conjunction with segmental racks 47. The levers 44 are capable of being disposed in such a position with respect to the side bars 1 and 2 so that the rollers 25 will be held off of the ground and the side bars 1 and 2 will rest firmly upon the ground, but said levers may be swung by moving the operating handle 46 until the rollers 45 will be moved below the plane of the lower edges of the side bars 1 and 2 and thus raise the latter from the ground.

When the supporting platform is resting upon the ground or other flat surface as shown in Fig. 2 of the drawings, the front wheels of a motor vehicle or any other vehicle may be run upon the same until the wheels rest substantially midway of the edges of the platform. By turning the handle 22 so as to impart motion to the winding drums 36 in the proper direction, the latter will wind the chains 43 thereupon. This upward movement of the chains 43 and consequently the chains 41 will cause the supporting platform to flex or bend around the wheels of the vehicle as indicated in dotted lines in Fig. 2 and if the winding is continued the end of the vehicle will be raised. Having the platform bent around the wheels to conform to the curvature of the same will prevent the wheels from becoming disengaged or running off of the platform. To lower the vehicle it is only necessary to rotate the operating handle 22 in the reverse direction, and as the platform reaches the ground or supporting surface it will flatten out so that the wheels of the vehicle may easily run off of the same.

The device is particularly applicable for use around grain elevators and mills where vehicles are to be preferably raised at their forward ends when they are being unloaded and inasmuch as the supporting frame carries the rollers 45, the device may be easily moved from place to place whenever it is desired to be used.

Various changes in form, proportion and in the minor details of construction may be resorted to without departing from the spirit of the invention as defined in the appended claims.

What is claimed is:

1. In a vehicle hoisting device, the combination of a flexible platform consisting of a plurality of bars hingedly connected together at adjacent edges, and means for raising and lowering said platform, said means including suspending elements fastened to the ends of the outermost bars of said platform whereby the latter is permitted to flex around a pair of wheels supported thereon.

2. In a vehicle hoisting device, the combination of a platform consisting of a plurality of bars hingedly connected together at adjacent edges to adapt said platform to flex around a pair of wheels of a vehicle, said bars being of varying thicknesses so that said platform is inclined from one edge to its intermediate portion, and means for raising and lowering said platform.

3. In a vehicle hoisting device, the combination of a supporting frame including a pair of upright posts, a flexible platform composed of a plurality of bars hingedly connected at adjacent edges to adapt said platform to flex around a pair of wheels of a vehicle, one of the intermediate bars being shorter than the others and having its ends disposed adjacent the inner faces of said posts, the ends of the bars adjacent this intermediate bar extending beyond said posts and adjacent the edges thereof whereby to guide said platform in its vertical movement, and means for raising and lowering said platform.

4. In a vehicle hoisting device, the combination of a supporting frame, a flexible supporting platform adapted to flex around a pair of wheels of a vehicle, a shaft mounted upon said frame, means for driving said shaft, brackets composed of opposing arms disposed around said shaft, means extending through the free ends of said arms and the adjacent portion of said shaft for clamping the brackets to the latter, drums disposed upon said shaft and connected to said brackets so as to turn with said shaft, flexible suspending elements connected at one of their ends to said platform and passing around said drums, and means for securing the other ends of said elements to said brackets.

In testimony whereof we have hereunto set our hands.

WILLIAM C. GEORGE.
FRED N. NOFSGER.